United States Patent [19]

Neff

[11] Patent Number: 4,861,404

[45] Date of Patent: Aug. 29, 1989

[54] METHOD OF MAKING A HONEYCOMB PRODUCT

[75] Inventor: Craig A. Neff, Golden, Colo.

[73] Assignee: Hunter Douglas Inc., Upper Saddle, N.J.

[21] Appl. No.: 90,766

[22] Filed: Aug. 28, 1987

[51] Int. Cl.$^4$ .......................... B32B 31/08; B32B 3/12
[52] U.S. Cl. ................................ 156/204; 156/272.8; 156/275.7; 156/292; 428/118
[58] Field of Search ............ 156/197, 204, 227, 272.4, 156/272.8, 275.7, 292; 219/121; 428/118

[56] References Cited

U.S. PATENT DOCUMENTS

| | | |
|---|---|---|
| 1,937,342 | 11/1933 | Higbie . |
| 2,234,058 | 4/1941 | Murray . |
| 2,254,820 | 12/1940 | Donner . |
| 2,803,578 | 8/1957 | Holland . |
| 3,018,205 | 1/1962 | Barut . |
| 3,515,036 | 6/1970 | Takehiro et al. . |
| 3,616,141 | 10/1971 | Anderson . |
| 3,802,145 | 4/1974 | Scanlon . |
| 4,020,205 | 4/1977 | Haselbauer . |
| 4,067,765 | 1/1978 | Heller et al. ..................... 156/272.4 |
| 4,194,550 | 3/1980 | Hopper . |
| 4,307,768 | 12/1981 | Anderson . |
| 4,347,887 | 9/1982 | Brown . |
| 4,625,786 | 12/1986 | Carter . |
| 4,710,253 | 12/1987 | Soszek ............................. 156/272.8 |

FOREIGN PATENT DOCUMENTS 756270 9/1956 United Kingdom .

Primary Examiner—Robert A. Dawson
Attorney, Agent, or Firm—Pennie & Edmonds

[57] ABSTRACT

A honeycomb product is made by providing a pleated sheet having legs which are made by securing two parts of a fold together. Two sheets are combined by securing the end of a leg to a crease of an opposite sheet. The sheet material is folded to provide alternating taller and shorter folds, and the taller folds are modified to provide the legs by cementing parts of the taller folds together. Gluing is accomplished by moving glue heads across the sheet at high velocity through the use of linear motors. The glue lines are heated after being laid down by the use of electromagnetic radiation, preferably from a high-powered laser. The finished product may be used as insulated window coverings, or the like.

10 Claims, 5 Drawing Sheets

FIG. 1
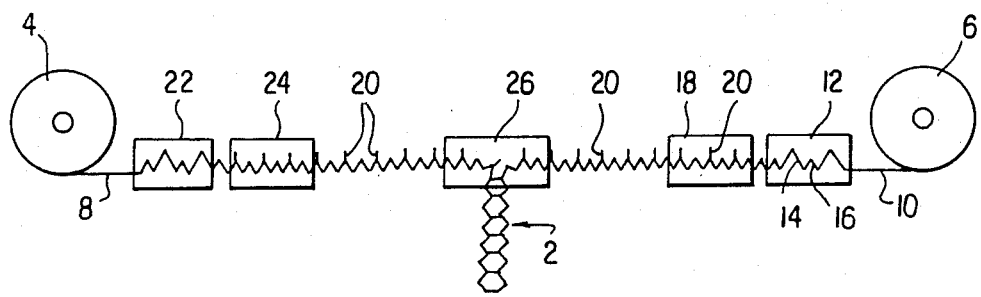
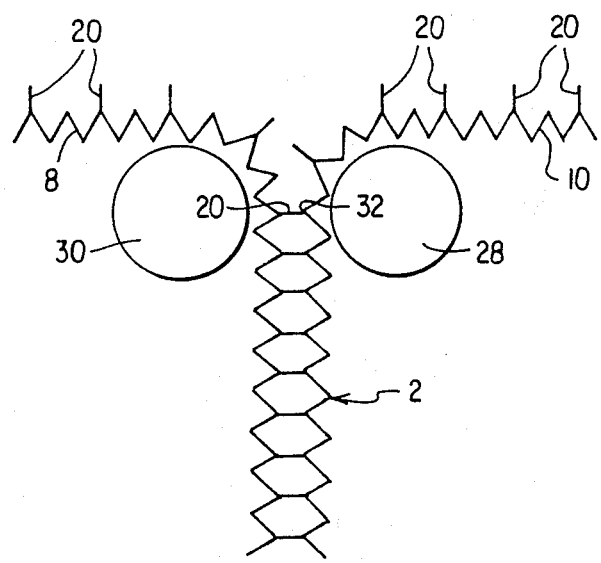
FIG. 2

FIG. 5
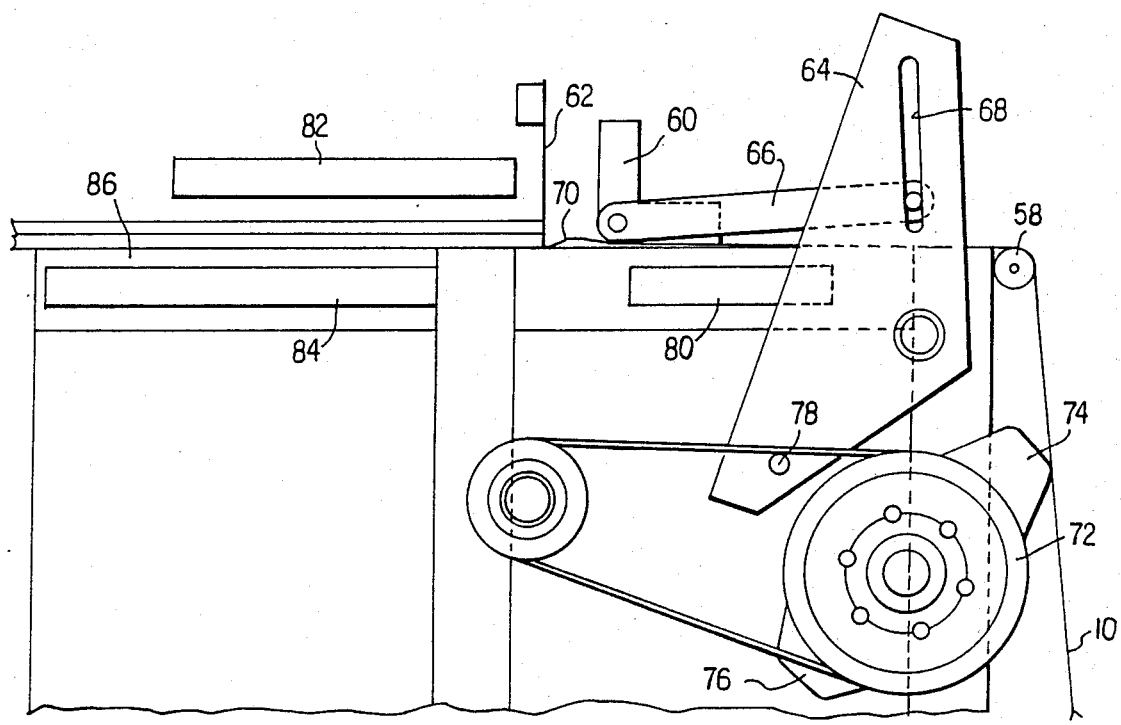
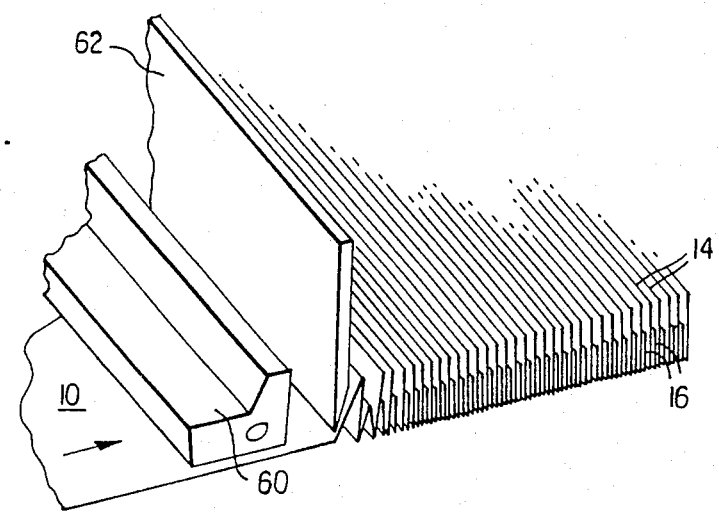
FIG. 6

4,861,404

METHOD OF MAKING A HONEYCOMB PRODUCT

TECHNICAL FIELD

This invention relates to the art of textiles. In particular, the invention is a honeycomb product for use as a window shade and methods and apparatus used in construction of that product.

BACKGROUND ART

Honeycomb materials for window coverings, or the like, are known. These coverings generally comprise folded sheets with selected folds connected to provide an elongated hollow channel. For example, U.S. Pat. No. 4,450,027 (Colson) shows a honeycomb material wherein a plurality of elongate tubes are stacked on top of each other and secured by adhesive to provide a hollow window covering. Similar products are shown in U.S. Pat. Nos. 4,603,072 (Colson) and 4,631,108 (Colson). Another type of construction which produces a hollow article is shown in U.S. Pat. No. 4,685,986 (Anderson) wherein two folded sheets are secured together at selected creases to produce the final product. Other disclosures of honeycomb structures may be found in U.S. Pat. Nos. 4,631,217; 4,676,855; 4,677,012; and 4,677,013 to Anderson.

The structure of a honeycomb product is important with respect to the methods and apparatus required for its manufacture. U.S. Pat. No. 4,685,986 (Anderson) describes a manufacturing technique wherein folded sheets of material are advanced toward each other while a centrally-located apparatus attaches selected creases of the two sheets to hold the sheets together and produce the product. U.S. Pat. No. 4,450,027 (Colson) shows another technique for manufacture of a honeycomb product. The Colson technique is to produce a single elongate tube which is wound around itself after adhesive is applied to provide an oblong coil of the hollow tubular element. The ends of the coil are then cut off leaving the center sections as the finished product.

SUMMARY OF THE INVENTION

In accordance with the invention, a honeycomb product comprises two folded sheets secured together at selected locations. The sheets include legs which are joined to creases on an opposite sheet, and the legs comprise parts of a fold which have been secured together. In the preferred process, a line of hot-melt adhesive is placed between parts of a fold, and the parts are pressed together to result in a narrow leg which can then be secured to a second sheet to form the honeycomb product.

Preferably, sheets of material are folded such that shorter folds alternate with taller folds. Then, parts of the taller folds are secured together to result in a leg and angled surfaces of the fabric which appear identical to the shorter folds. Because the taller folds alternate with the shorter folds, each sheet will provide shorter folds alternating with the legs after the taller folds have been modified to produce the legs. Then, these two sheets are attached together with each leg being cemented to the crease of a fold in the opposite sheet.

In a preferred arrangement for manufacturing the product, the two sheets are formed in essentially identical processes such that the two sheets advance toward a common machine for securing the two sheets together to produce the final product.

The preferred machine for creating the folds, or pleats is an improvement of a known Enguda pleating machine manufactured in Taiwan. A pleat bar engages material to be folded and pushes it against a knife edge to provide the fold. The pleat bar is controlled by a novel cam having lobes of two different sizes to cause the pleat bar to alternately engage different lengths of material to produce alternate folds having different heights. The material is heated both before and after folding to "set" the folds in the material.

After the material has been pleated, it is passed through a modifying machine to create the legs. The modifying machine includes two elongate jaws which form a slot for receiving a fold. A nozzle mounted to a linear motor places a line of hot-melt adhesive in a predetermined location in the fold, and the jaws are closed to press the two parts of the fold together to form the leg.

After the pleated sheets have been modified to provide the legs, two sheets are joined together to produce the finished product. An indexing machine provides knife edge-like plates for engaging selected folds of the material and positioning the folds in a desired location. In this desired location, a leg on one of the sheets is aligned with a crease on an opposite sheet, and these are secured together. Preferably, the leg and crease are secured by placing a line of hot-melt adhesive onto the butt connection between these elements. The adhesive is "driven" into the material by the heat from a laser beam, the beam moving across the width of the material immediately behind the hot-melt adhesive nozzle. The beam is preferably obtained from a 2000 watt carbon dioxide laser, and a cylindrical lens is used to provide a focal line so that the radiation is spread out along approximately one to two inches of the length of the line of adhesive.

A linear motor is used to control both hot-melt adhesive nozzles because of the high speed obtainable with a linear motor and because of of its smooth operation. A linear motor has essentially no vibration, and thus solves a problem of the prior art wherein the vibrations of the drive system are transmitted to the glue nozzle and to the glue stream causing the glue to form a sinuous path.

It is an object of this invention to provide a unique honeycomb product having legs formed in folds of one sheet and secured to an opposite sheet.

Another object of this invention is to provide a method and apparatus for manufacture of a unique honeycomb product.

BRIEF DESCRIPTION OF THE DRAWINGS

FIG. 1 is a schematic view of a preferred process for assembling a honeycomb product in accordance with the invention.

FIG. 2 is a schematic diagram of a mechanism for securing two sheets of pleated material to form a product in accordance with the invention.

FIG. 5 is a schematic diagram of a pleating machine in accordance with the invention.

FIG. 6 is a schematic perspective of a portion of the pleating machine shown in FIG. 5.

DETAILED DESCRIPTION OF THE INVENTION

Figure 3:
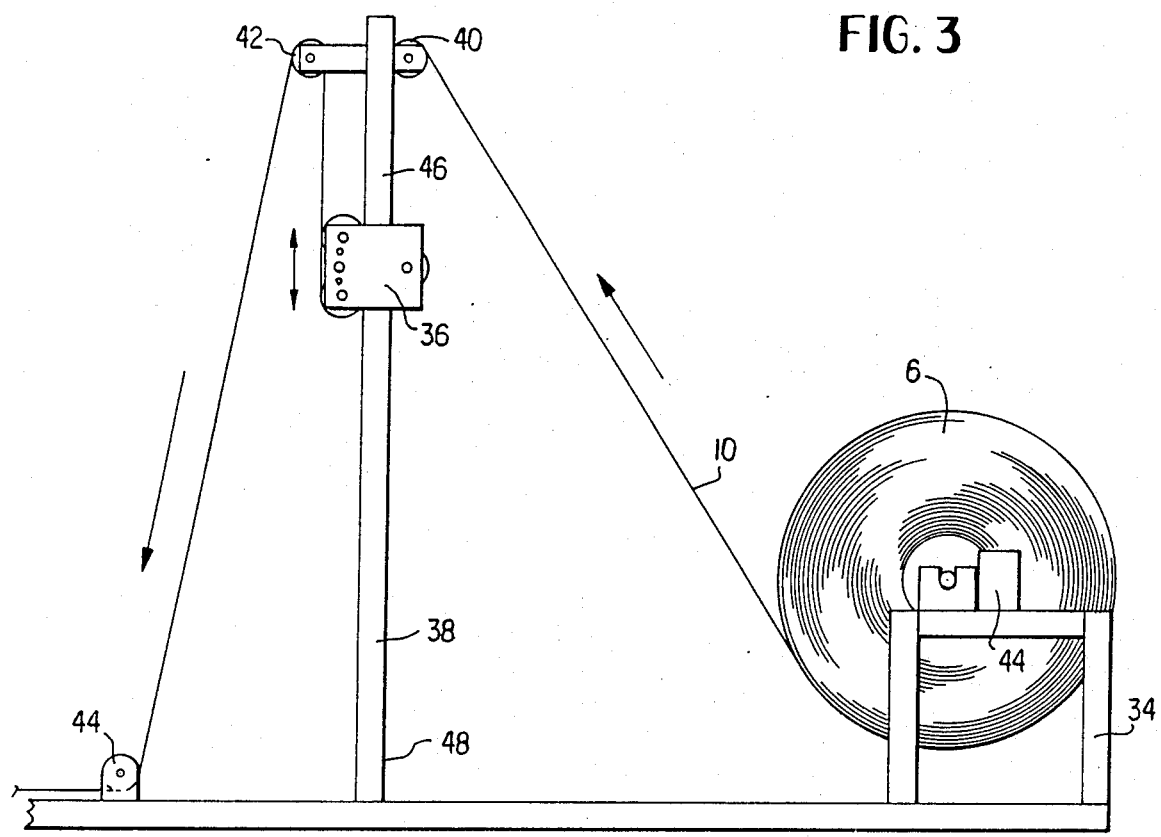
FIG. 3 is a side view of a material-feeding apparatus in accordance with the invention.

FIG. 1 is a schematic diagram of a process for forming a honeycomb product 2 in accordance with the invention. The product is formed by the combination of two sheets of fabric, and these sheets are supplied from rolls 4 and 6 at opposite ends of an assembly for manufacture of the honeycomb product 2. A sheet of fabric 8 from roll 4 and a sheet of fabric 10 from roll 6 are preferably subjected to identical treatments so that two substantially identical sheets are combined to produce the product 2. It will appreciated, however, that other products may be manufactured by subjecting sheets 8 and 10 to different treatments and that a product substantially identical to the honeycomb product produced by the process of FIG. 1 may be made by combining two sheets which have been subjected to different treatments.

A sheet 10 is passed through a pleating machine 12 which provides large pleats 14 and smaller pleats 16 in fabric 10. Preferably, fabric 10 is a polyester which maintains a crease when folded in the presence of heat, and this process will be described more fully below. After the pleating operation, sheet 10 is passed through a modifier 18 which modifies the larger pleats 14 to provide legs 20. The process for forming legs 20 will be described more fully below, but at this point it may be noted that legs 20 are formed by securing two parts of the larger pleats together.

Sheet 8 is subjected to a similar process by passing it through a second pleater 22 and a second modifier 24, which are preferably identical to pleater 12 and modifier 18, respectively.

The pleated and modified sheets 8 and 10 are combined in an indexing and joining machine 26, and the finished product 2 exits.

FIG. 2 is a schematic enlargement of the indexing and joining operation carried out in indexing and joining apparatus 26. Indexing jaws 28 and 30, shown only schematically, are placed on opposite sides of a gap into which modified sheets 8 and 10 are fed. Jaws 28 and 30 perform an indexing function whereby the creases in sheets 8 and 10 are aligned. Then, a plate which will be described more thoroughly with respect to FIG. 9 engages a loose leg 20 and moves it into position adjacent a crease such as shown at 32 in FIG. 2, and a cementing operation takes place to join the end of leg 20 to the crease 32.

With reference to FIG. 3, the preferred apparatus for supplying material will be described. A roll 6 of material 10 is supported on an axle mounted on a stand 34. A movable carriage 36 is mounted on a post 38, and an identical, laterally spaced structure is on an opposite side of the apparatus. Material 10 is fed from roll 6 over a roller 40, under a roller mounted on carriage 36, and over a second roller 42. The material is then passed under a roller 44 for providing a repair walkway, and the material is then directed into a pleater which will be described with respect to FIGS. 5 and 6.

Rotation of roll 6 is controlled by a motor 44 which includes a geared shaft which engages a gear on the axle supporting the roll of fabric. Carriage 36 is provided with a predetermined weight which will in turn place a predetermined tension on sheet 10. As the material is fed into the pleating machine, carriage 36 moves upwardly because motor 44 prevents rotation of roll 6 during this period. When carriage 36 reaches an uppermost position, a sensor 46 causes motor 44 to allow roll 6 to unwind, thus allowing movable carriage 36 to move downwardly. When carriage 36 reaches the bottom of post 38, sensor 48 is activated, and motor 44 is instructed to secure roll 6 from further rotation. It will be appreciated that this operation maintains a constant tension on sheet 10 which allows the subsequent operations to be accurately controlled.

Figure 4:
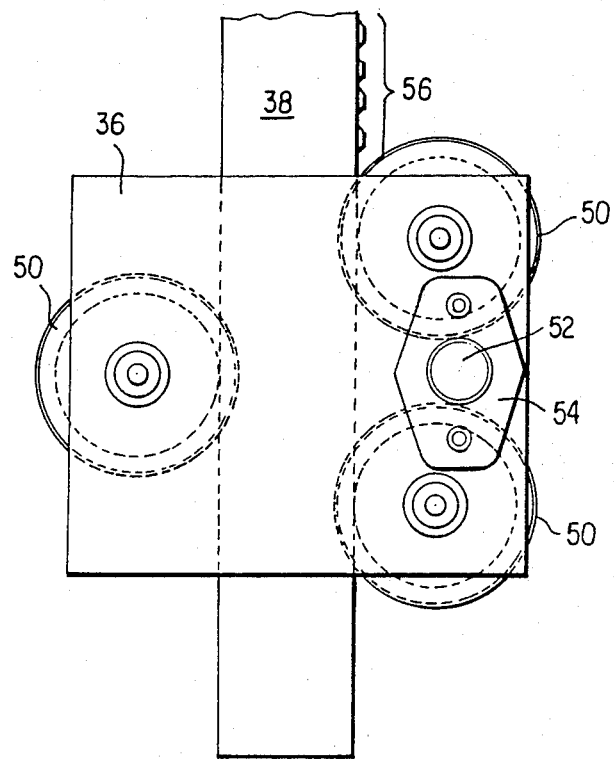
FIG. 4 is an end view of a tensioning apparatus shown in FIG. 3.

A unique feature of the mechanism shown in FIG. 3 is shown more clearly in FIG. 4. Carriage 36 includes three rollers 50. These rollers engage post 38 to allow smooth, even movement of carriage 36 along post 38. A shaft 52 extends across the width of the feeding apparatus to the other carriage and carries a roller 54, which is mounted for free rotation about shaft 52 and also extends substantially across the width of the feeding apparatus. Sheet 10 passes under roller 54 as shown in FIG. 3. A gear (not illustrated) is fixed to each end of shaft 52 and engages a toothed rack 56 which is secured to post 38. The gear on the opposite end of shaft 52 similarly engages a rack such as rack 56, and the racks are adjusted so that the teeth are in level alignment. Thus, carriage 36 on one side of the material feeding apparatus moves exactly in the same manner as does the similar carriage on the opposite side of the material feeding apparatus. This causes the material 10 to be fed evenly into the pleater.

The pleater will be described with respect to FIGS. 5 and 6. Material 10 is directed into the pleating machine by passing over a roller 58, is fed under a pleating bar 60, and is held by a knife edge 62. The pleating bar 60 is caused to reciprocate by the motion of a plate 64 which is connected to the pleating bar 60 by a link 66. A slot 68 permits adjustment of the location of the link with respect to plate 64. The general use of a pleating bar 60 to cooperate with knife edge 62 to form pleats is known in the art, and the apparatus shown in FIG. 5 is a modification of a pleating machine manufactured by Enguda of Taiwan.

Sheet 10 passes under pleating bar 60 and engages a part of the bar so that as the pleating bar moves forwardly toward knife edge 62, sheet 10 is folded upwardly, such as at 70 to form a fold or pleat. As pleating bar 60 moves closer to knife edge 62, fold 70 becomes tightly compressed to make a straight crease. Then, knife edge 62 moves upwardly to allow the fold to move to the far side of knife edge 62, pleating bar 60 moves in a rearward direction and then moves toward knife edge 62 again to create a subsequent fold. In accordance with the invention, the pleating machine provides folds of alternately varying heights so that legs 20, as described with respect to FIGS. 1 and 2 may be provided.

The prior art machine is modified to include a cam 72 having lobes 74 and 76 thereon. When taller lobe 74 engages cam follower 78 on plate 64, pleating bar 60 is caused to make a large rearward motion, thus creating a large fold during the forward motion. When cam follower 78 engages a shorter lobe 76, pleating bar 60 moves a shorter distance rearwardly and thus forms a shorter fold during the forward motion.

It will be appreciated that cam plate 72 causes rearward motions of pleating bar 60 of alternating lengths to provide pleats of alternating heights.

The end product of the described motions of pleating bar 60 may be seen with more clarity in FIG. 6. Folds 14 are taller than folds 16, the smaller folds 16 being formed by shorter rearward movements of pleating bar 60 and the taller folds 14 being formed by larger rearward movements of pleating bar 60.

The preferred material to be pleated is a polyester material which is capable of heat-setting. Thus, a front heater 80 is provided to heat the material 10 prior to being folded, and top discharge heater 82 and bottom discharge heater 84 are placed in the discharge region to provide additional heat at the locations of the creases to thoroughly set the folds in the material.

It is desirable that the folds have straight crease lines, and in the preferred embodiment, a plate 86 is used between the bottom discharge heater and the lower surface of the folded material to transmit heat to the material. This plate is preferably a piece of granite approximately one inch thick which, it has been discovered, provides a flat, non-wraping surface with a high heat capacity which delivers exceptional results in the pleating process.

Figure 7:
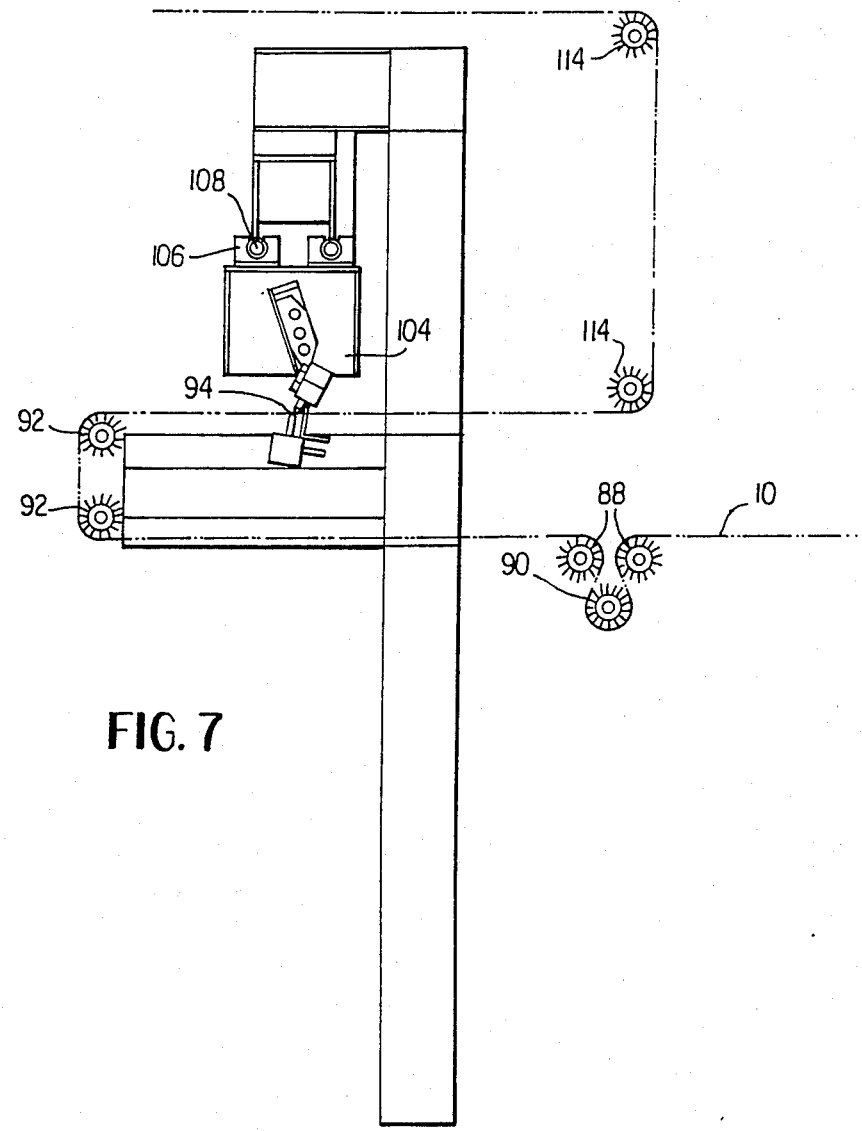
FIG. 7 is an end view of a machine for modifying the pleated fabric in accordance with the invention.

After the material has been pleated as shown in FIG. 6, it is subjected to a modifier which produces legs 20. A preferred form of a modifier is shown in FIG. 7. Pleated material 10 is fed into the modifier by drive rollers 88, which have elongate plates 90 for engaging folds of the material being fed. This allows the material to be fed into the machine with great precision so that individual folds may be modified. The passage of material 10 around rollers 88 is shown only schematically in FIG. 7. After leaving rollers 88, the material 10 passes around rollers 92 and is then fed into a modifying apparatus 94 which will be fully described with respect to FIG. 8.

Figure 8:
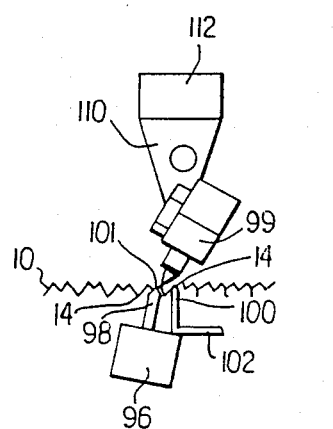
FIG. 8 is an end view of an adhesive applying apparatus for use with the apparatus of FIG. 7.

With reference to FIG. 8, the modifying apparatus 94 includes a vacuum box 96 and a pair of jaws 98 and 100. Material is fed into the gap between opened jaws 98 and 100 by the rollers, and when a large fold 14 is in location between the jaws 98 and 100, a vacuum is applied to the vacuum box 96 to pull the fold into the desired location between the jaws. Then, a glue dispenser 98 is activated to deposit a line of hot-melt adhesive 101 in a predetermined location inside the fold 14. After the glue has been deposited, and before it cools, jaw 100 is caused to pivot by actuator 102 whereby it presses two parts of fold 14 together until adhesive 101 cools. Then, rollers 88 and 92, and other rollers in the system, are activated to advance the sheet until a subsequent large fold 14 is placed in the gap between jaws 98 and 100, and the process continues. After this operation, legs 20 described with respect to FIGS. 1 and 2 have been formed.

FIG. 7 shows a preferred orientation of glue dispenser 99'. FIG. 7 illustrates a glue dispenser 99 as being mounted on a mounting plate 104 which is in turn supported by bearings 106 which engage rails 108. A motor is then activated to drive mounting plate and glue dispenser 99 in a linear direction along the fold 14 to deposit the line of glue 101.

A preferred arrangement is shown in FIG. 8 wherein the glue dispenser 99 is carried by a movable plate 110 of a linear motor 112.

The use of a linear motor is highly advantageous, as has been described above, because of its lack of vibration and its high speed. By the use of the apparatus shown in FIG. 8, a straight line of adhesive 101 is rapidly placed in the desired location between the parts of fold 14.

Figure 9:
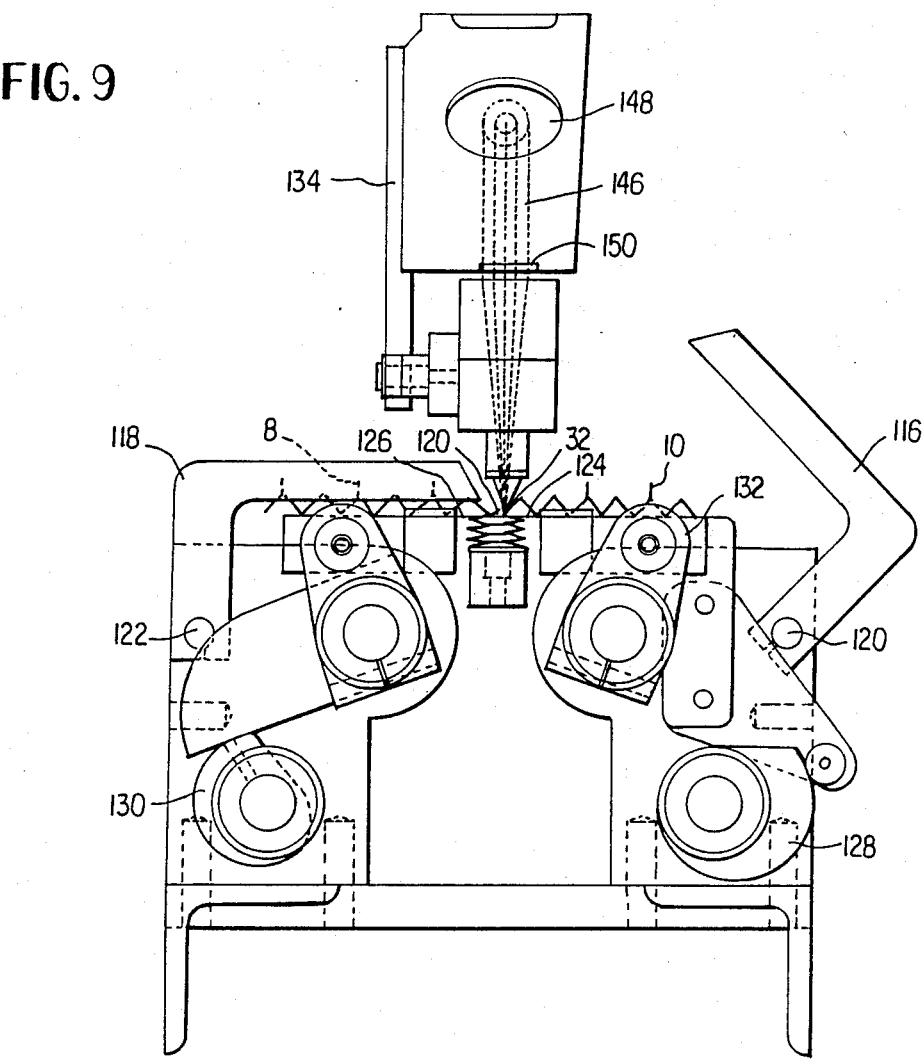
FIG. 9 is an end view of a machine for securing two sheets together using the process shown in FIG. 2.

After the sheet 10 has emerged from the gluing station, it passes around subsequent rollers 114 which direct it to an indexing and joining machine 26 which will be described with respect to FIGS. 9 and 10. With reference to FIG. 9, the first sheet 10 is directed into the indexing and joining machine from the right of FIG. 9, and sheet 8 is directed into the machine from the left of FIG. 9. Flaps 116 and 118 are generally U-shaped in plan and are pivotally mounted for rotation about respective pivots 120 and 122. As the sheets 8 and 10 are advanced through the indexing and joining apparatus, flaps 116 and 118 are raised to allow the material to be advanced. Indexing jaws 124 and 126 engage respective pleats of sheets 8 and 10 to position the sheets accurately with respect to each other whereby a leg 20 may be secured to a crease 32 as described above with respect to FIG. 2. After the jaws 124 and 126 have accurately positioned the two sheets, one of the flaps 116 or 118 is pivoted downwardly to a position as shown in FIG. 9 whereby a leg 20 is engaged and held in a position wherein its remote end abuts a crease 32. During this operation, the other flap is in a raised position, the other flap being pivoted downwardly during the next operation in sequence, while the first flap is raised. In this manner, the alternate legs are alternately pressed into the proper position by flaps 116 and 118 operating in sequence. The flaps are preferably pneumatically operated, but other mechanisims may be employed.

Jaws 124 and 126 are controlled by cams 128 and 130, only one pair of the cams being shown in FIG. 9. These cams operate two mechanisms, one of which carries a jaw 124 or 126. A first cam 130 causes a jaw mounting block 132 to move outwardly, while the second cam 128 causes the jaw to pivot with respect to the mounting block 132. Thus, the jaw 124 or 126 moves in a somewhat eliptical path so that it engages individual creases of the sheets 8 and 10 to bring the sheets into a desired alignment.

As noted, when the sheets are in the desired alignment, a flap 116 or 118 pivots downwardly to urge leg 20 into a position such that one end of leg 20 is immediately adjacent a crease 32. Then, a line of hot-melt adhesive is placed at the junction of the end of leg 20 and the crease 32 to provide a butt joint between the two. The glue is applied by an apparatus shown schematically at 134 of FIG. 9, and the preferred gluing apparatus is shown in more detail in FIG. 10.

Figure 10:
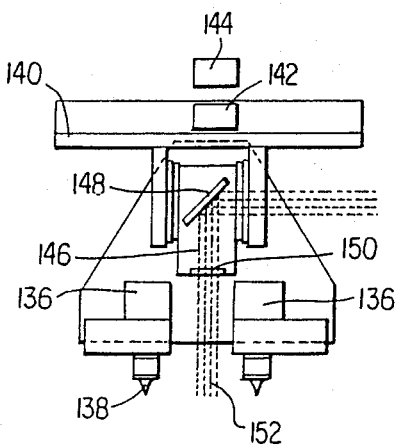
FIG. 10 is a front view of a preferred glue-applying apparatus for with the machine of FIG. 9.

With reference to FIG. 10, a glue head 136 includes a nozzle 138 for dispensing glue, and head 136 is carried by a movable plate 140 of a linear motor 142. A guide rail 144 of the linear motor extends across the machine shown in FIG. 9, whereby glue nozzle 138 is caused to move along and directly above the joint between leg 20 and crease 32. A line of adhesive is deposited at that connection to secure the two parts together.

With reference to FIG. 10, a unique technique for ensuring a secure connection is the use of a laser to heat the adhesive after it has been deposited by the nozzle 138. A beam 146, preferably from a 2000 watt carbon dioxide laser is directed onto a mirror 148 which is carried by movable plate 140 along with glue head 136. Beam 146 is passed through an anamorphic lens system 150 to form a linear focal line 152 on the line of glue laid down by nozzle 138. By spreading the beam out along the glue line, a large amount of energy can be transmitted to the glue without damaging the material.

The heating caused by the irradiation of the glue line "drives" it into the material, thus ensuring a secure attachment of leg 20 to crease 32.

Modification of the described product, machines or processes within the scope of the appended claims will be apparent to those of skill in the art.

What is claimed is:

1. A process for the manufacture of expandable, collapsible material having hollow portions therein, for use in a blind, shade or the like, comprising folding a first sheet of material to provide a plurality of transverse creased folds therein, folding a second sheet of material to provide a plurality of transverse creased folds therein, modifying the first sheet to provide a plurality of first legs therein by forming folds and by securing parts of each of said folds together and combining said first and second sheets of material so that said first legs are directed towards the second sheet and a fold of said second sheet is directed towards and in-line with each of said first legs, and adhering said first legs at their free ends to the folds of the second sheet in line therewith.

2. A process according to claim 1 wherein said step of securing comprises placing a line of adhesive along the intersection of said first leg and said second sheet and heating said line of adhesive.

3. A process according to claim 2 wherein said adhesive is hot-melt adhesive and said step of heating comprises irradiating said adhesive with electromagnetic radiation.

4. A process according to claim 3 wherein said step of irradiating comprises directing a beam from a laser onto said adhesive.

5. A process according to claim 4 wherein said beam forms a line on said adhesive.

6. A process according to claim 1 wherein the second sheet is modified to provide a plurality of second legs by forming folds and by securing parts of each of said folds together and combining said first and second sheets of material so that said second legs are directed towards the first sheet and a fold of said first sheet is directed towards and in-line each of said second legs, and adhering each of said second legs at their free ends to the folds in the first sheet in line therewith.

7. A process according to claim 1 wherein said step of modifying includes placing a line of adhesive in each of said folds that is to form a leg parallel with and at a distance from said fold's free end and pressing the fold parts together along the line of adhesive.

8. A process according to claim 1 wherein each fold of the second sheet that is adhered to a first leg is formed by one of said transverse creased folds.

9. A process according to claim 1 wherein said step of folding said first sheet comprises the step of providing alternating folds of respective first and second heights, the second height being larger than the first height, and forming said first legs by securing parts of each of said folds of second height together.

10. A process according to claim 9 wherein said step of folding said second sheet comprises the step of providing alternating folds of respective first and second heights, the second height being larger than the first height and forming second legs by securing parts of each of said folds of second height together and said step of combining said first and second sheets of material includes the positioning of the second sheet with each of said second legs directed towards the first sheet and in line with a fold of first height of the first sheet and each of the folds of first height of the second sheet in line with a first leg, and adhering each of said first and second legs at its free end to the respective fold of first height in line therewith.

* * * * *